June 3, 1958   M. A. SABARA   2,836,920
BAIT CASTING CATAPULT
Filed Jan. 17, 1955
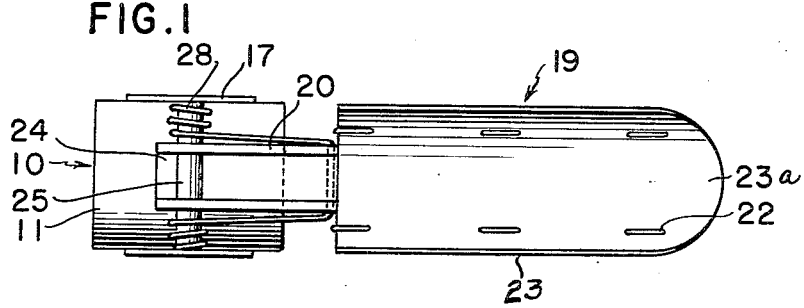
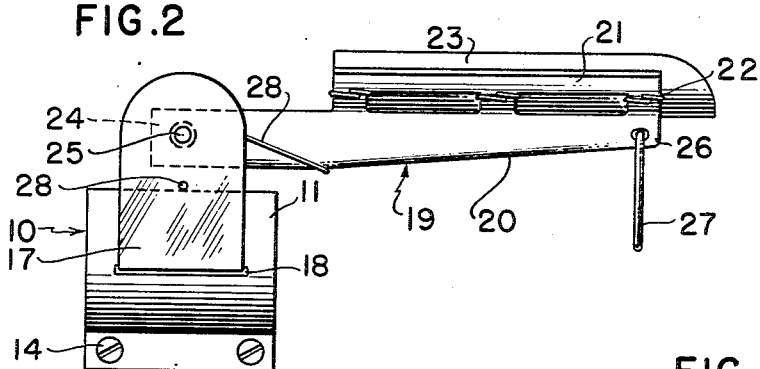
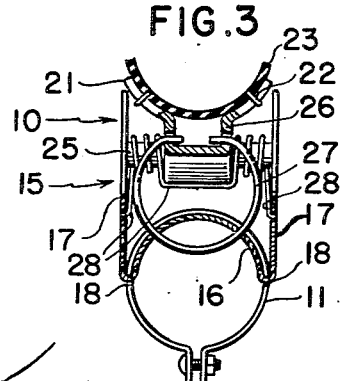
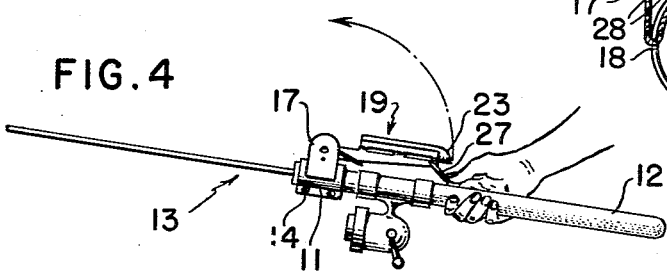
Michael A. Sabara
INVENTOR.
BY *Nelson J. Edge*
ATTORNEY 2,836,920

BAIT CASTING CATAPULT

Michael A. Sabara, Brooklyn, N. Y.

Application January 17, 1955, Serial No. 482,159

2 Claims. (Cl. 43—19)

The present invention relates to a bait casting catapult and refers more particularly to a device mounted on a fishing rod and casting bait in the direction in which the rod is pointed but without substantial movement of the rod except for the pointing thereof.

An object of the present invention is the elimination of physical fatigue of the fisherman due to the exertion involved in conventional bait casting.

A further object is the provision of bait casting means which can operate in restricted space which would prevent the conventional operation of bait casting.

Another object is the provision of a bait casting device of maximum simplicity, of small size, light in weight, and cheap to manufacture.

Still another object is to provide a bait casting device which will improve the accuracy of bait casting by experienced and beginner fishermen alike.

Other objects will appear as the description proceeds.

In accomplishing the objects of the present invention, a hollow cylindrical clamp is provided for attaching the device firmly to the handle of a conventional fishing rod. The device further includes a journal member with upright standards pivotally mounting a cradle or trough for swinging motion in the substantially vertical plane of the rod. The cradle is urged by a coil spring to a forward, inverted position and may be retracted to a rear, upright position in which the bait is placed therein for the cast. A finger ring is freely pivotally mounted at the outer end of the cradle, and the tension of the spring can be regulated, to regulate the distance of the cast, by varying the rearmost position to which the cradle is drawn by the finger prior to being released. Release of the cradle then casts the bait in the direction in which the rod is pointed.

The invention accordingly consists in the features of construction, combinations of elements and arrangements of parts which will be exemplified in the constructions hereinafter described. In the accompanying drawing, in which is shown one of the various possible illustrative embodiments of this invention:

Figure 1 is a top plan view of the device.

Figure 2 is a side elevation.

Figure 3 is a rear end view, partially in section.

Figure 4 is a side elevation showing the device mounted on a fishing rod.

Referring now in detail to the drawings, my improved bait casting catapult 10 comprises the hollow longitudinally split cylindrical sheet metal clamp 11 encompassing the handle 12 of a conventional whip-like fishing rod 13, and clampingly engaged thereon by tightening of the screws 14. The journal member 15 comprises the hollow semi-cylindrical sheet metal base portion 16 located inside clamp 11 and in contact with the interior surface of the latter and held thereby against the handle 12, the latter being omitted from Figures 1, 2 and 3. Journal member 15 further has the upright standards 17 extending through the elongate slots 18 located on opposite sides of clamp 11.

Cradle 19 is an elongate trough formed of sheet metal, having a base portion 20 of rectangular channel shape in cross section merging into an open topped segmental cylindrical portion 21 to which is fixed by staples 22 a sheet of rubber like material 23 constituting a container in which the bait is to be placed for casting.

The heel end portion 24 of cradle 19 is pivotally mounted by pin 25 in the standards 17 of journal member 15, and the opposite, free end portion 26 has freely pivotally mounted therein the finger ring 27.

The double coil spring 28 is mounted on pin 25 and urges cradle 19 to swing to a forward, inverted position in advance of pin 25. Cradle 19 may be manually swung to the rear, upright position illustrated in the drawings, against the force of spring 28.

To operate the device, cradle 19 is swung rearwardly and held in such position by the thumb of the fisherman engaging the finger ring 27, as illustrated in Figure 4, the remaining fingers and palm of the same hand meanwhile holding handle 12 while bait is placed in cradle 19 by the other hand of the fisherman. The tied end of the line attached to the bait should be adjacent the heel end of cradle 19.

The loading of spring 28 may be varied, in order to control the length of the cast, by varying the degree of depression of free end 26 by the finger ring and thumb. Some fishermen may prefer to use the index finger to engage ring 27. Although better control is obtained by use of ring 27, some may prefer to remove it and to engage the free end of cradle 19 directly by the thumb or index finger. The upward facing free end surface 23A provides a convenient place for the finger or thumb for this purpose.

Upon release of ring 27 when the rod 13 has been pointed to the desired spot, the bait is catapulted to said spot, cradle 19 coming to rest in the inverted, forward position where it is out of the way while the fisherman waits for the bait to be taken by the fish.

Use of my catapult permits casting from locations where the ordinary method of casting would be impossible, such as from under overhanging tree branches and so forth.

I am aware that the catapult is a very ancient device and that it has frequently been proposed to modify a fishing rod by the addition of a pivot joint approximately midway its length, thereby hoping to achieve catapult advantages in the difficult art of bait casting. These attempts have destroyed the necessary qualities, such as whippiness and controllability, of the fishing rod. It may be possible to fish with such devices, but the user must then develop an entirely new technique of landing the fish. My device may be attached to the fisherman's favorite rod or made as a part of a new rod having all the advantages of the traditional fishing rod.

It will thus be seen that there is provided a device in which the several objects of this invention are achieved, and which is well adapted to meet the conditions of practical use. As various possible embodiments might be made of the above invention, and as various changes might be made in the embodiments above set forth, it is to be understood that all matter herein set forth or shown in the accompanying drawing is to be interpreted as illustrative and not in a limiting sense.

What is claimed is:

1. Bait casting cataput comprising the combination with a fishing rod of a longitudinally split hollow cylindrical clamp encompassing said rod, said clamp being formed with a pair of elongate apertures extending longitudinally and on opposite sides thereof, a journal member having a hollow substantially semi-cylindrical base portion located inside said clamp and in contact with said rod and with an inner surface of said clamp, said journal member further having a pair of standard portions extending through said apertures and substantially vertically upwardly therefrom, an elongate cradle member, a pin pivotally mounting an end portion of said cradle member in said standard portions for swing motion from a rear, upright position to a forward inverted position, a coil spring mounted on said pin and engaging said cradle member and urging the same to said forward position, and a finger ring pivotally mounted on the opposite end portion of said cradle member, said ring constituting keeper means for holding said cradle in said rear position against the action of said spring, while bait is placed in said cradle, and said spring swinging said cradle forward to cast said bait when said ring is released.

2. Bait casting catapult comprising the combination with a fishing rod of a longitudinally split hollow cylindrical clamp encompassing said rod, said clamp being formed with a pair of elongate apertures extending longitudinally and on opposite sides thereof, a journal member having a hollow substantially semi-cylindrical base portion located inside said clamp and in contact with said rod and with an inner surface of said clamp, said journal member further having a pair of standard portions extending through said apertures and substantially vertically upwardly therefrom, an elongate cradle member, a pin pivotally mounting an end portion of said cradle member in said standard portions for swinging motion from a rear, upright position to a forward inverted position, and a coil spring mounted on said pin and engaging said cradle member and urging the same to said forward position, said cradle member including finger purchase means for holding said cradle in said rear position against the action of said spring while bait is placed in said cradle, and said spring being adapted to swing said cradle forward to cast said bait when said cradle is released.

References Cited in the file of this patent

UNITED STATES PATENTS

| | | |
|---|---|---|
| 467,238 | Rennie | Jan. 19, 1892 |
| 1,140,608 | Phillips | May 25, 1915 |
| 1,226,162 | Attula | May 15, 1917 |
| 1,376,260 | Davis | Apr. 26, 1921 |
| 2,245,484 | Leavans | June 10, 1941 |
| 2,593,885 | James | Apr. 22, 1952 |
| 2,691,840 | Smith | Oct. 19, 1954 |